United States Patent [19]
Cooney

[11] 3,932,875
[45] Jan. 13, 1976

[54] DIRECTIONAL ANTENNA
[76] Inventor: John R. Cooney, Friendship St., Waldoboro, Maine 04572
[22] Filed: May 13, 1974
[21] Appl. No.: 469,535

[52] U.S. Cl............... 343/820; 343/831; 343/113 R
[51] Int. Cl.² ........................................... G01S 5/02
[58] Field of Search......... 343/731, 831, 908, 113 R

[56] References Cited
UNITED STATES PATENTS
2,404,196  7/1946  Seeley .............................. 343/731
3,213,458  10/1965  Hansel et al. ...................... 343/876

Primary Examiner—Eli Lieberman

[57] ABSTRACT

A single element directional antenna consisting of a cylindrical element of such a size compared to the wavelength of the received signal that measurable difference on phase are detectable at spaced output points around the circumferential edge of the element to provide directional information.

2 Claims, 6 Drawing Figures 3,932,875

DIRECTIONAL ANTENNA

BACKGROUND OF THE INVENTION

The present invention relates to antennas and more particularly to the single element VHF to UHF directional antenna.

Radio direction-finding antennas make use of the difference in the time of arrival of the wave front at different points of the receiving antenna system, whether it be a parabolic mirror focussing all parallel rays to a common point, or an array of discrete antenna elements. Hertz and Marconi used parabolic mirrors, and practical systems involving discrete elements were thoroughly understood and in use by the early part of the century.

Arrays of discrete elements are particularly suitable in the VHF and UHF range of signals, where loop systems are inefficient and parabolic reflectors would be too physically large for most applications. The following discussion is concerned principally with vertically-polarized waves in this portion of the spectrum.

A typical directional antenna comprises an array of quarter-wave elements mounted on a ground plane. Another type of directional antenna comprises four half wave dipoles vertically mounted on a mast. In this type of antenna, the signal arrives at the various elements at different times, so that the outputs are in varying phase relationship with each other and are used in a number of various ways to determine the bearing of an incoming signal. These systems are also useful in directional transmitting applications as well as for receiving.

SUMMARY OF THE INVENTION

The present invention is directed to cylindrical antenna element of such an appreciable size, as compared to the wavelength of the signal being received, that useful and measurable differences in relative phase are detectable at different points on its circumference. For example, a single homogenous cylinder, of one-half wavelength in length, shunt-fed at pairs of vertically spaced points around its circumference can provide directional information.

A preferred embodiment is formed by splitting the cylinder into two quarter-wave, series-fed sections. The top portion is an inverted cylindrical can supported a small distance above the ground plane by an insulator and having four output junctions spaced 90° apart around the lower edge of the can. The center conductor of a coaxial output cable is connected to the edge of the can at the junction points. The shield of the coaxial cable is connected to a lug on the ground point. With this arrangement and using appropriate circuits, directional information is possible.

Some of the practical advantages of the system over a conventional discrete arrangement of elements are noted as follows: The antenna can be simply fabricated, so as to be mechanically very rugged, immune to breakage and easily protected against lightning. The space inside the cylinder is usable as a weatherproof container for electronic circuitry, thereby allowing much of the direction finding signal processing to be done at that point. Only a simple, non-critical connecting cable is required to connect the antenna to its associated readout equipment; the system provides superior accuracy because the homogenity of the can arrangement produces uniformity of the phase differences measured at points around the can perimeter as a function of signal direction. This exceeds that attainable with discrete elements and their not-easily-predicable interaction with each other.

It is therefore a general object of the invention to provide an effective, practical and efficient directional antenna of simple mechanical design and superior accuracy.

Other objects, advantages and features of the invention will be apparent in the following description and claims considered together with the attached drawings.

BRIEF DESCRIPTION OF THE DRAWINGS

Details of the invention and a preferred embodiment thereof, will be further understood with reference to the drawings wherein.

DESCRIPTION OF THE PREFERRED EMBODIMENTS

Figure 1:
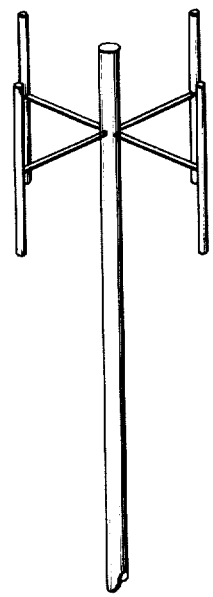
FIGS. 1 and 2 are examples of prior art directional antennas.

FIG. 1 illustrates a typical prior art directional antenna including four half wave dipoles 10, mounted by rods 12 on a mast 14.

Figure 2:
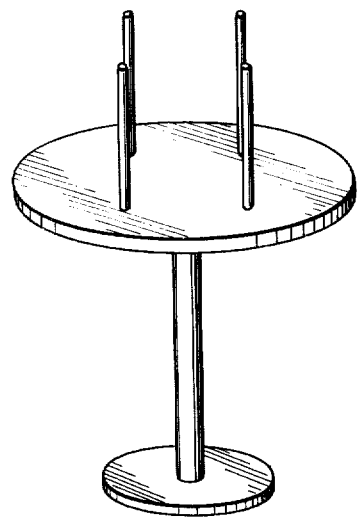

FIG. 2 illustrates another prior art directional antenna including an array of quarter wave elements 20 mounted on a ground plane 22, which is mounted on a base support 24.

With both of the above types of directional antennas, the signal that is received arrives at the various elements at different times. This causes the output signals from each of the receiving elements to vary in their phase relationship. These phase related signals are then processed by means of known circuit techniques to provide the required directional information.

Figure 3:
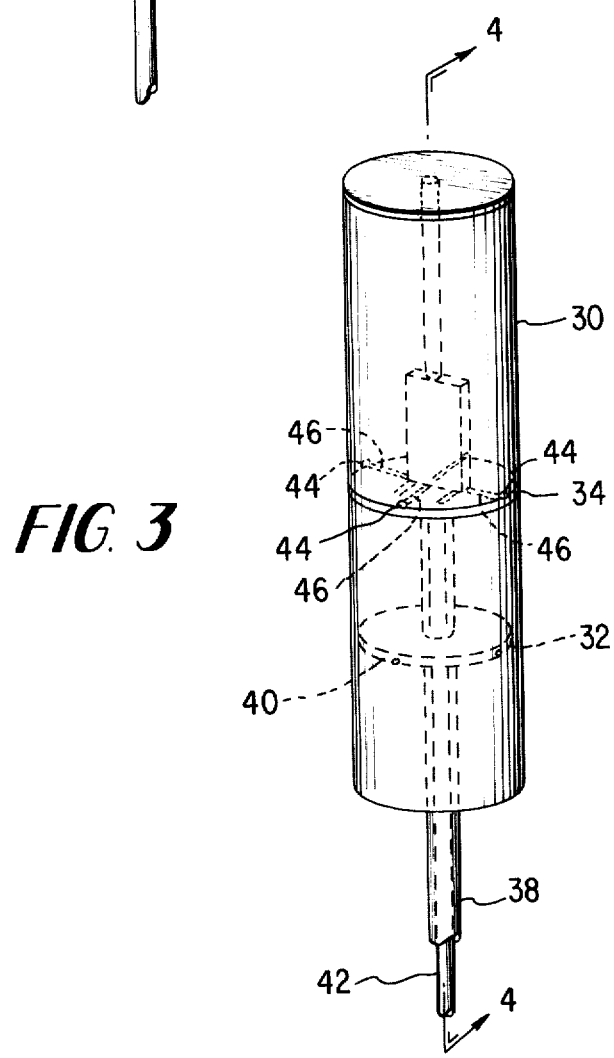
FIG. 3 is an isometric view of the antenna of the present invention.
Figure 4:
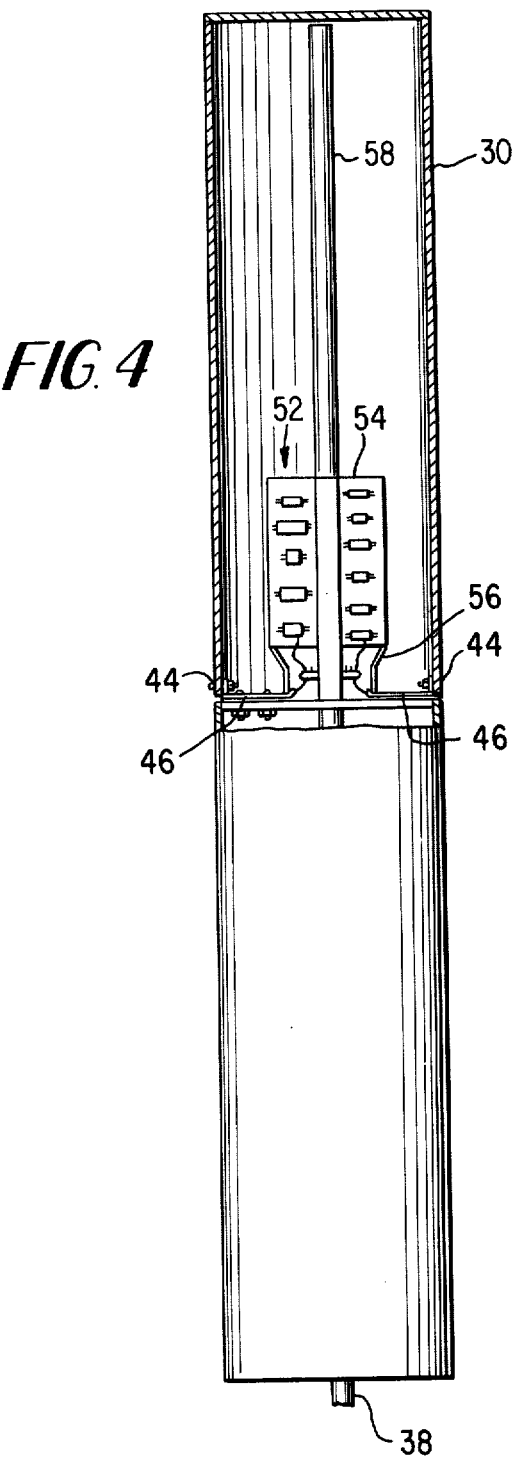
FIG. 4 is a sectional view of the antenna of the present invention.
Figure 5:
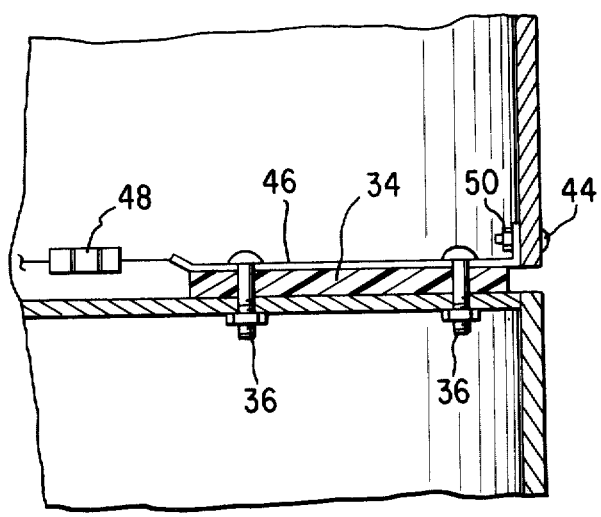
FIG. 5 is a view of a detail of FIG. 4.

The present invention is illustrated in FIGS. 3, 4 and 5 and comprises an antenna formed of a cylinder split into two quarter-wave sections having series fed connections. A first inverted quarter wavelength cylindrical can 30 is supported on a second inverted quarter wavelength cylindrical can 32 and insulated therefrom by an annular insulator 34 of polyethylene or the like by suitable mounting bolts 36 preferably made of nylon. Both cans 30 and 32 are mounted on a mounting staff 38, attached to the top of the lower can 32. A circular plastic spacer 40 having a hole in its center to accommodate the mounting staff is secured to the lower can 32 by suitable fasteners to provide further structural rigidity to the device.

A coaxial cable 42 runs through the mounting staff 38 and the center conductor of the coaxial output cable is connected to four equally spaced signal pickup points 44 on the circumference of the upper can 30 which form the receiver elements of the antenna. The coaxial cable 42 conductors are connected to these pickup points by means of four transmission strip lines 46 and diode switches 48. The end of the strip lines 46 connected to the pickup points are secured to the periphery of the upper can 30 by suitable fasteners 50 and form a conductive path with the upper can 30 at that point. The strip lines are further held in position by the nylon bolts 36 which secure the insulator to the lower can 32. The diode switches 48 which are connected in the electrical circuit which includes switch driving circuits 52. These circuits are mounted on a printed circuit board 54 which in turn is mounted upon a heavy grounded bracket 56 bridging the cable entrance.

In order to protect the system against lightning, a center ground conductor 58 is provided. It would preferably be a rod of approximately one-half inch in diameter which is connected to the ground points described above.

Figure 6:
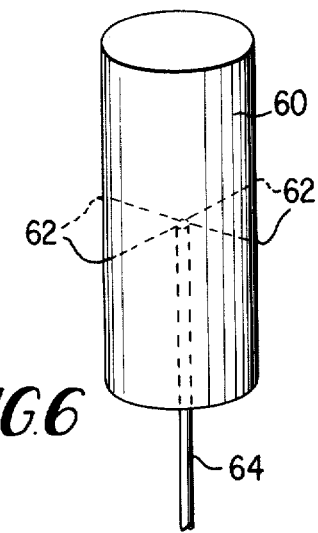
FIG. 6 is a view of an alternate embodiment.

FIG. 6 illustrates an embodiment of the invention wherein the cylinder is a single homogeneous element 60 shunt fed at a series of points around the circumference and mounted on a staff 64. In other respects this antenna may be similar to the antenna described above.

The length of the antenna should be of the order of one-half wavelength at the center frequency of interest for best efficiency and be of appreciable diameter as compared to the wavelength of the signal.

The arrangement of the pickup points spaced equally on the circumference of the upper can 30 are capable of receiving UHF and VHF signals. Each of the pickup points acts in the same manner as the prior art antennas to provide phase displaced signals to the electronic circuits to provide directional information. The coaxial cable 42 running through the mast carries the D.C. to the switch driving circuits 52 and also receives the rf and synchronizing information to an appropriate receiver. The switch driving circuits 52 act to cause the appropriate diode to conduct while the others remain open to provide the directional information.

Thus, it will be appreciated that the difference in distance of the signal pickup points from the source of the signals around the circumference of the antenna provides essentially the same phase displaced signals as a plurality of spaced antenna elements, and these signals will be a function of the direction of arrival of the signal because of the finite difference between the times of arrival of the wave front at the pickup points.

The simplicity and durability of the cylindrical shape of the antenna is obvious over the element array arrangement. Another feature lies in the fact that many more than four pickup points may be used with the addition of appropriate circuits.

It is to be understood that the form of the invention herewith shown and described are to be taken as preferred examples of the same, and that various changes in the shape, size and arrangement of parts may be resorted to, without departing from the spirit of the invention of scope of the subjoined claims.

I claim:

1. A radio direction finding antenna for receiving vertically polarized wave signals comprising a conductive cylindrical element of one half wavelength in length, a mounting staff connected to said element, discrete signal pickup means spaced about the internal-periphery of said cylindrical element, circuit means including a printed circuit board mounted within said element and coupled to said pickup means for relating said signals into directional information based on the phase displacement of the signals at the spaced pickup points and a coaxial cable routed through said mounting staff and coupled to said circuit means.

2. The antenna of claim 1 wherein said element comprises two inverted cylindrical cans each of a quarter wavelength in size and insulator means for mounting one of the cans above the other.

* * * * *